United States Patent
Snyder et al.

(10) Patent No.: US 6,450,845 B1
(45) Date of Patent: Sep. 17, 2002

(54) PASSIVE OCCUPANT SENSING SYSTEM FOR A WATERCRAFT

(75) Inventors: Richard H. Snyder, Oshkosh, WI (US); Richard E. Staerzl, Fond du Lac, WI (US)

(73) Assignee: Brunswick Corporation, Lake Forest, IL (US)

(*) Notice: Subject to any disclaimer, the term of this patent is extended or adjusted under 35 U.S.C. 154(b) by 26 days.

(21) Appl. No.: 09/810,784

(22) Filed: Mar. 16, 2001

(51) Int. Cl.[7] ............................................... B63H 21/22
(52) U.S. Cl. ........................................... 440/1; 280/735
(58) Field of Search ............................ 440/1; 280/735

(56) References Cited

U.S. PATENT DOCUMENTS

| | | | |
|---|---|---|---|
| 3,807,343 A | * 4/1974 | Peebles | 180/273 |
| 4,022,146 A | * 5/1977 | Sadler | 180/273 |
| 4,093,754 A | 6/1978 | Yost | |
| 4,743,213 A | * 5/1988 | Nishida | 114/55.56 |
| 4,759,731 A | * 7/1988 | Uchida et al. | 440/1 |
| 4,839,478 A | 6/1989 | Howard | 200/52 |
| 4,941,854 A | * 7/1990 | Takahashi et al. | 114/55.57 |
| 5,108,321 A | 4/1992 | Nelson | 440/3 |
| 5,171,063 A | 12/1992 | Stidd | 297/344 |
| 5,330,226 A | 7/1994 | Gentry et al. | 280/735 |
| 5,525,843 A | 6/1996 | Howing | 307/9.1 |
| 5,653,462 A | 8/1997 | Breed et al. | 280/735 |
| 5,702,123 A | 12/1997 | Takahashi et al. | 280/735 |
| 5,871,232 A | 2/1999 | White | 280/735 |
| 6,276,974 B1 | * 8/2001 | Bouge et al. | 114/362 |

* cited by examiner

Primary Examiner—Jesus D. Sotelo
(74) Attorney, Agent, or Firm—William D. Lanyi

(57) ABSTRACT

A tetherless occupant detector system uses an infrared sensor and a monitor circuit that provides a deactivation signal to an engine control unit or other control mechanisms in the event of an operator of the marine vessel leaving a preselected control position at its helm. The infrared sensor provides an output signal that is generally representative of the heat produced by an occupant within the control position of a marine vessel. The monitor circuit reacts to a sudden decrease in this heat magnitude and provides a deactivation signal in response to detecting this sudden decrease. The deactivation signal provided by the monitor circuit can be received by an engine control unit which then, in turn, deactivates a marine propulsion system. Alternatively, the deactivation signal itself can cause a deactivation of the marine propulsion system.

19 Claims, 4 Drawing Sheets

PASSIVE OCCUPANT SENSING SYSTEM FOR A WATERCRAFT

BACKGROUND OF THE INVENTION

1. Field of the Invention

The present invention is generally related to a passive occupant detection system for a watercraft and, more particularly, to a tetherless safety switch that deactivates a marine propulsion system in the event that the operator of a marine vessel is not present at a preselected location.

2. Description of the Prior Art

Many different types of occupant detection systems are known to those skilled in the art. These systems have been used in automobiles and in conjunction with marine vessels.

U.S. Pat. No. 4,839,478, which issued to Howard on Jun. 13, 1989, describes a push button safety switch. A pair of switch terminals are mounted within a housing which also carries a plunger for movement relative to the housing. The plunger is biased for movement along a path of travel by a compressed spring. A push button actuator has a knob for contact by user and a plunger actuator carried by the knob. The actuator also defines a stem portion to support a tether clip coupled to the boat operator. The boat motor ignition circuit is electrically connected to the switch terminals and the motor can be deactivated by either user contact with the knob or through movement of the plunger initiated by separation of the tether clip from the push button actuator.

U.S. Pat. No. 5,330,226, which issued to Gentry et al on Jul. 19, 1994, describes a method and apparatus for detecting an out of position occupant. The apparatus for controlling the actuation of a vehicle occupant restraint system includes a displacement center mounted to the vehicle dashboard for sensing the distance between the: air bag storage location and the occupant in a seat. An infrared sensor is mounted in the headliner above the occupant. The infrared sensor has a plurality of viewing fields for sensing the location of the occupant relative to the air bag storage location and provides an output indicative of the occupant's location relative to the air bag storage location. A controller determines the distance between the occupant and the air bag storage location from the output of the infrared sensor. The controller is also connected to the displacement sensor. The controller provides an electric enable signal when at least one of the sensors indicates that the occupant is at least a predetermined distance from the air bag storage location.

U.S. Pat. No. 5,525,843, which issued to Howing on Jun. 11, 1996, describes a seat occupant detection system. A method and system for detecting the presence of an occupant on a vehicle seat is described. The vehicle seat is provided with at least a pair of electrodes which are connected to a detection circuit for detecting a change in capacitance between the electrodes. If the detection circuit detects a significantly large change in capacitance, a positive detection signal is produced. To reduce the risk of interference, the electrodes of the detection circuit are substantially insulated from the chassis of the vehicle and its electrical system when the detection system is in an active condition.

U.S. Pat. No. 5,653,462, which issued to Breed et al on Aug. 5, 1997, describes a vehicle occupant position and velocity sensor. The sensor utilizes either ultrasonic, microwave, or optical technologies, or seatbelt spool out and seat position sensors. These are used as inputs to the primary vehicle crash sensor circuit to allow the longest possible sensing time before the occupant gets proximate to the airbag and is in danger of being injured by the deploying airbag. The sensor further disables the inflatable restraint system if the occupant is in danger of being injured by the system deployment. Separate systems are used for the driver and passenger to permit the optimum decision to be made for each occupant.

U.S. Pat. No. 5,702,123, which issued to Takahashi et al on Dec. 30, 1997, describes an airbag apparatus for a passenger seat. The apparatus includes a first sensor for detecting an occupant seated in a passenger seat, a second sensor for detecting a state in which the occupant is approaching an instrument panel excluding a state in which the occupant put out his or her hands on the instrument panel, and a deployment controller for changing the control of deployment of an airbag when the occupant is detected by the first sensor and the state in which the occupant is approaching the instrument panel is detected by the second sensor.

U.S. Pat. No. 5,871,232, which issued to White on Feb. 16, 1999, describes an occupant position sensing system which incorporates first and second position sensors, wherein the first position sensor senses the distance to the surface of an object and a second position sensor senses the electric field influencing properties of the object for purposes of controlling the activation of a safety restraint system. In an exemplary system, the first position sensor incorporates either an infrared beam or an ultrasonic beam as the sensing element, and the second position sensor senses the capacitance of a plurality of electrodes for either disabling an air bag inflator if the combination of the first and second position measurements of an occupant is within a threshold, or for controlling a controllable air bag inflator.

U.S. Pat. No. 5,171,063, which issued to Stidd on Dec. 15, 1992, describes a boat captain's helm chair which has a seat part which is movable forwardly and rearwardly relative to a support with a back rest that has a retaining member such that its forward movement is counteracted. The forward portion of the seat part is rounded relative to the remaining portion to provide a support for the user in both a sitting and semi-standing rearward leaning postural position. Side portions of the seat extend forwardly of its mid portion to prevent lateral movements of the user. A compressive distortion of the armrest is counteracted by a dense U-shaped shock absorber to prevent the distortion of the armrest from constant use.

U.S. Pat. No. 5,108,321, which issued to Nelson on Apr. 28, 1992, describes a motor boat with an auxiliary motor. A motor boat with auxiliary and main motors and having a transom with a pocket or recess constructed and arranged to receive and support an auxiliary outboard motor. The auxiliary motor is connected to a steering control in a helm control center which steers both the auxiliary and main motors. Preferably operating controls enable starting, tilting, and steering of boat motors and associated propulsion assemblies from the helm. Preferably, the operating controls include a cable carried in a sheathing attached to a steering wheel mounted in the helm control center and adapted to turn or move the rudder of the main motor and the auxiliary motor propulsion assembly to thereby steer the boat.

U.S. Pat. No. 4,092,754, which issued to Yost on Jun. 6, 1978, describes a boat interior and cabin design. A hull is provided defining longitudinal upstanding opposite sides interconnected by a bottom extending between lower marginal edges of the side and by a bow structure at their forward ends and a transom structure at their rear ends. A pair of spaced apart midship opposite side compartments are provided immediately inwardly of the sides and define a center longitudinal aisle therebetween. A helm is disposed immediately rearward of one of the compartments and the sides terminate upwardly in generally horizontal gunwales. The compartments project upwardly appreciably above the gunwales and include forward upper portions inclined forwardly and downwardly toward the gunwales.

The patents described above are hereby expressly incorporated by reference in the description of the present invention.

Unlike automotive applications, marine applications of propulsion systems must consider the possibility that the operator of the marine vessel may attempt to move away from the operator seat or control location at the helm while the marine vessel is being operated. This may occur voluntarily or inadvertently. In certain accident scenarios, the operator of the marine vessel may be thrown from the boat or watercraft while the marine propulsion system, such as an outboard motor or outboard engine or stem drive system or a conventional inboard system, remains in an operative condition. It is important to provide some type of occupant detection system that can disable the marine propulsion system under certain conditions if the operator of the marine vessel leaves a preselected position at the control station near the helm. However, tethers can be cumbersome and require positive action by the operator in order to operate properly.

It would therefore be significantly beneficial if a tetherless and passive occupant detection system could be provided for a watercraft, such as a boat so that the operator's action is not necessary.

SUMMARY OF THE INVENTION

An occupant sensing system for a watercraft made in accordance with the present invention comprises a marine propulsion system attached to the watercraft and a control position where a vessel control mechanism is located for manipulation by an operator of the watercraft to control the operation of the marine propulsion system. The vessel control mechanism can be a steering wheel, a throttle and shift control handle, trim buttons, or an ignition switch. A sensor is directed toward the control position of the watercraft and has an output signal which is representative of a first preselected characteristic of the control position. The present invention further comprises a monitor circuit connected in signal communication with the sensor for deactivating the marine propulsion system in response to a second preselected characteristic of the output signal.

The first characteristic is typically the presence of a human being at a preselected location within the control position and the sensor can be an infrared sensor. The second preselected characteristic is a decrease in the magnitude of the output signal from the sensor. The monitor circuit is also connected in signal communication with a neutral switch in certain embodiments of the present invention, whereby the monitor circuit only deactivates the marine propulsion system when the neutral switch is in a position signifying that the marine propulsion system is either in forward or reverse gear. The monitor circuit is connected in signal communication with a start switch of the marine propulsion system in certain embodiments. The monitor circuit can comprise a portion of the circuit that provides a time delay of a preselected duration subsequent to the marine propulsion system initially being started, as represented by a preselected status of the start switch, during which the monitor circuit does not deactivate the marine propulsion system in response to the second preselected characteristic of the output signal. The monitor circuit, in certain embodiments of the present invention has a deactivation signal output which is representative of an occurrence of the second preselected characteristic of the output signal. The system of the present invention can further comprise an engine control unit connected in signal communication with the monitor circuit and with a component of the marine propulsion system, whereby the electrical signal deactivates the marine propulsion system by providing the deactivation signal to the engine control unit which, in turn, deactivates the marine propulsion system in response to receipt of the deactivation signal from the monitor circuit.

The control position can be a seat where the operator of the watercraft normally is located at during operation of the watercraft. The sensor can be mounted on a dashboard of the watercraft, on a throttle and shift control housing of the watercraft in a steering wheel hub, or under a dashboard of the watercraft. Alternatively, the sensor can be mounted at any convenient location where it can be directed toward a position where the operator of the marine vessel is expected to be during operation of the marine vessel with the gear selector in a forward or reverse position.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
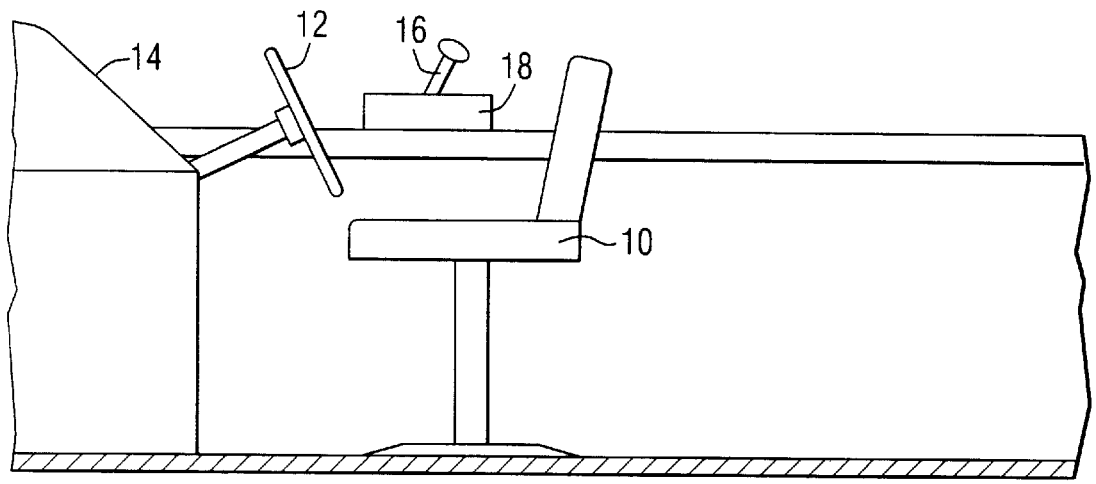
FIG. 1 is a simplified side view of a control position of a marine vessel.

Throughout the description of the preferred embodiment of the present invention, like components will be identified by like reference numerals.

FIG. 1 is a side view of a schematically represented control position of a watercraft, such as a power boat. In this example, the control position is provided with a seat 10 where the operator of a marine vessel can sit while controlling the operation of the watercraft. The control position is provided with a steering wheel 12 that extends from a dashboard 14. Also in the control position, near the seat 10, is a throttle control handle 16 that is movable with respect to a throttle and shift control housing 18.

Figure 2:
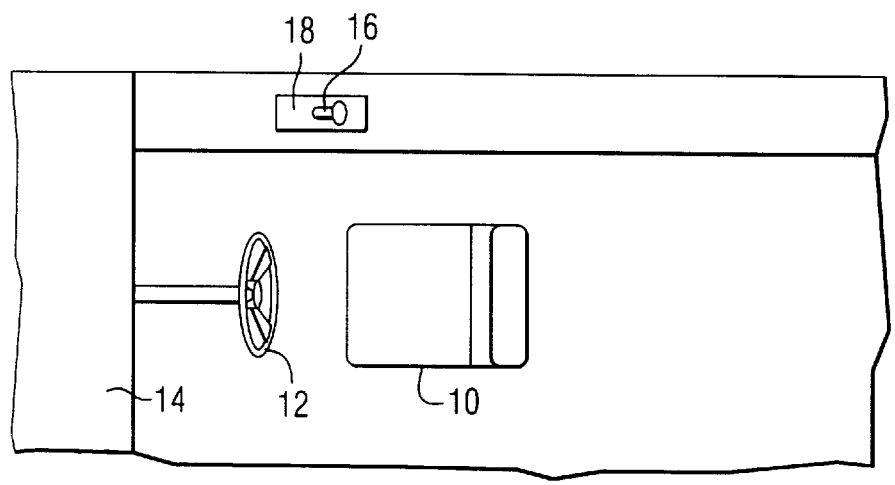
FIG. 2 is a simplified top view of a control position of a marine vessel.

FIG. 2 represents a top view of the control position, showing the marine vessel operator's seat 10 located directly behind the steering wheel 12 and along side the housing 18 of the throttle and shift control handle 16.

Figure 3:
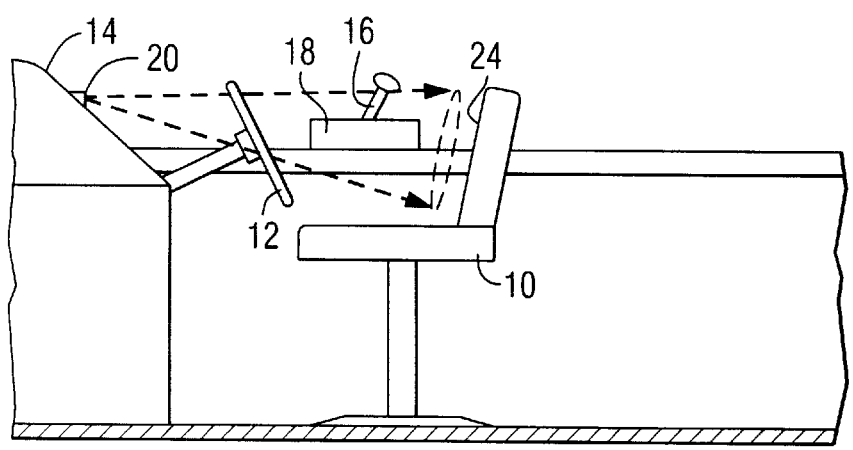
FIGS. 3–8 illustrate several possible locations of a sensor in relation to a control position of marine vessel.
Figure 4:
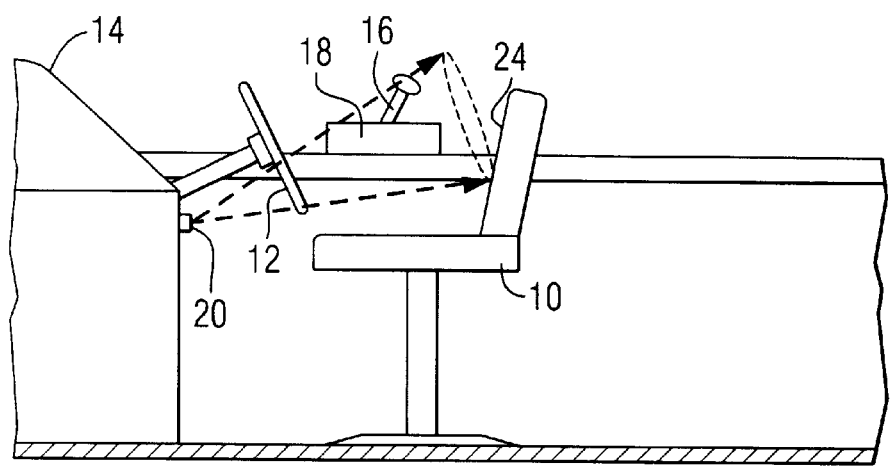

FIGS. 3 and 4 show two alternative positions of a sensor within the scope of the present invention. In FIG. 3, the sensor, as represented by reference numeral 20 is mounted on the dashboard 14 of the marine vessel and is directed in a rearward direction through the region of the steering wheel 12 and toward the seat back 24 of the seat 10. When the operator of the watercraft is sitting on the seat 10 within the control position, the sensor 20 will detect the position of the operator. If the sensor 20 is an infrared sensor, as in a preferred embodiment of the present invention, the heat generated by the body of the operator of the watercraft sitting on the seat 10 will provide a signal that can be monitored as will be described in greater detail below. FIG. 4 shows an alternative position of the sensor 20 below the dashboard 14 and also below the steering wheel 18. The sensor 20 is directed in an upward direction toward the seat back 24 in order to sense the presence of the body of the operator when the operator is sitting on the seat 20.

Figure 5:
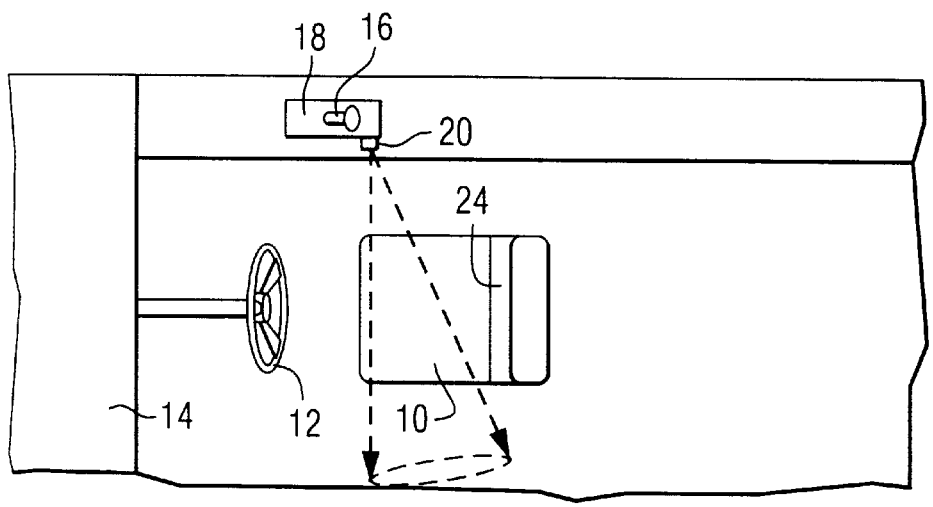

In FIG. 5, an alternative position of the sensor 20 is shown. The sensor 20 is attached to the housing 18 of the throttle and shift control handle 16 and is positioned to view in a direction sideward through the control position above the seat 10. The presence of an operator within the control position will be detected by the sensor 20.

Figure 6:
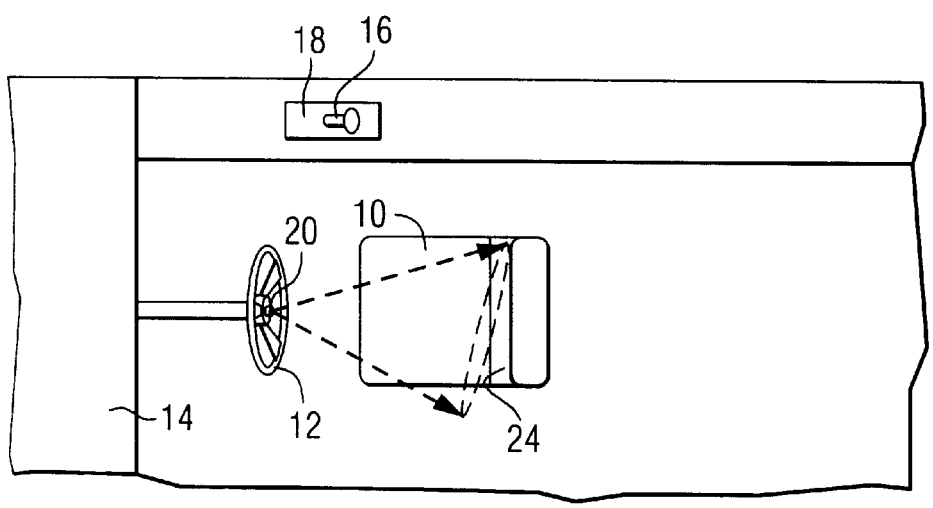

FIG. 6 is an alternative embodiment of the present invention wherein the sensor 20 is attached to the steering wheel 18 and directed in a rearward direction toward the seat back 24. When a human being sits on the seat 10 within the control position, the sensor 20 will detect the heat naturally produced by the body of the operator.

With reference to FIGS. 1–6, it can be seen that the control position is the region where a vessel control mechanism is located for manipulation by an operator of the watercraft. The vessel control mechanism can be the steering wheel 18, the throttle handle 16, or an ignition switch (not illustrated in FIGS. 1–6, but typically located on the dashboard 14).

Figure 7:
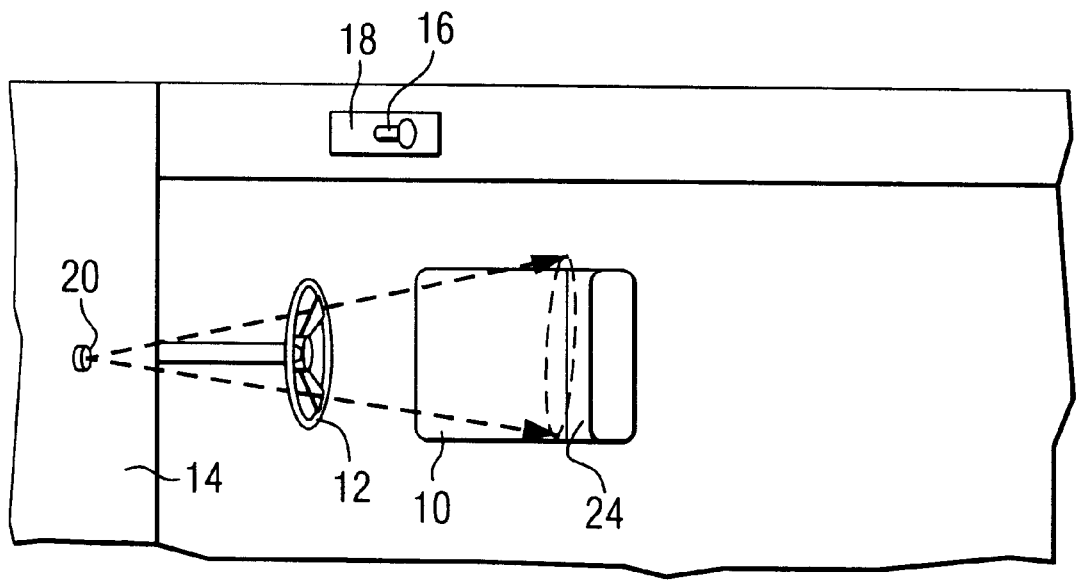
Figure 8:
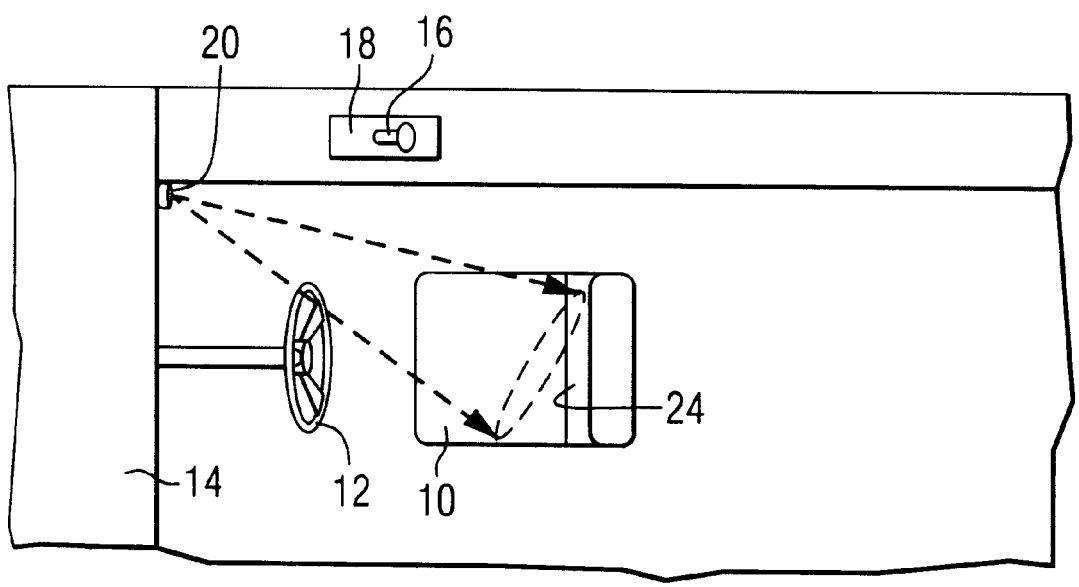

FIGS. 7 and 8 show two alternative positions of the sensor 20. The arrangement illustrated in FIG. 7 is generally similar to the arrangement described above in conjunction with FIG. 3, with the sensor 20 being located at some position near the dashboard 14 and directed rearwardly through the steering wheel 18 toward the seat back 24. FIG. 8 shows the sensor 20 located at a position near the dashboard 14 and toward the right relative to the steering wheel 18. The sensor 20 is directed at an angle toward the seat back 24. Although FIG. 8 is a top view, it should be understood that the height of the sensor 20 can be at the level of the seat surface, at a lower level, or at a higher level looking down on the surface of the seat 10.

Figure 9:
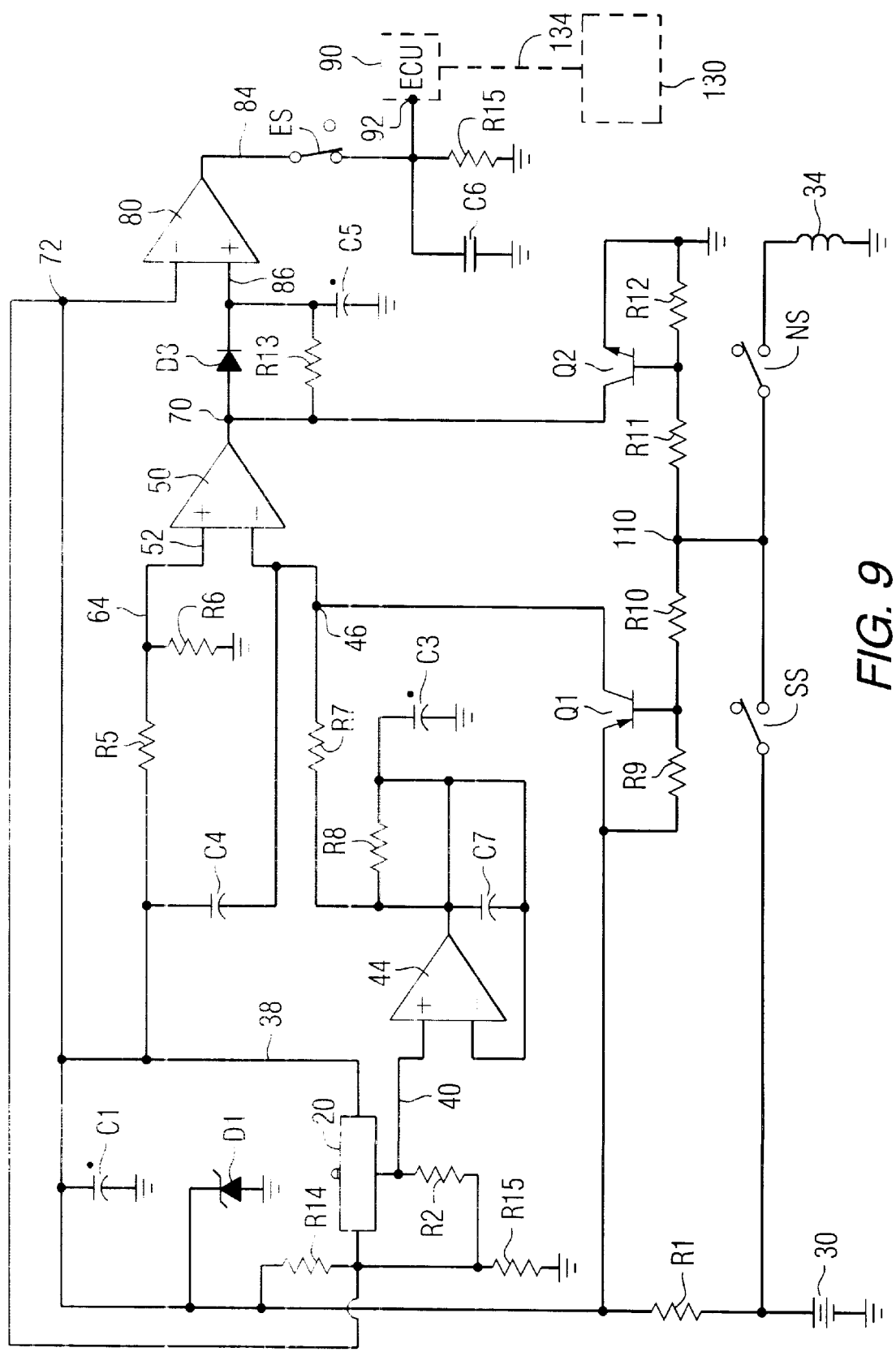
FIG. 9 is an electrical schematic of a monitor system made in accordance with the present invention.

FIG. 9 shows a monitor circuit of the present invention that is connected in signal communication with the sensor 20 for deactivating the marine propulsion system in response to a second preselected characteristic of the output signal from the sensor 20. The monitor circuit in FIG. 9 gets its power from a twelve volt battery 30. The battery 30 is connected to a starting solenoid 34, to a start switch SS and a neutral switch NS. The start switch SS is a manual switch used by the operator of the marine vessel to start the engine of the marine propulsion system.

The neutral switch NS is a switch that is closed when the gear shift of the throttle handle 16 is in a neutral position. If the gear selector is in either a forward or reverse gear selection position, the neutral switch NS is opened.

Power is provided to the sensor 20 on line 38. The sensor 20 provides an output signal on line 40 that is representative of the magnitude of heat sensed by the sensor 20. As described above, a preferred embodiment of the present invention uses an infrared sensor 20. The output from the sensor 20, on line 40, is provided to the non-inverting input of an operational amplifier 44. Resistor R2 operates as a load resistor and capacitor C7 provides a filtering function. Connected to the output of operational amplifier 44, resistor R8 and capacitor C3 provide a time constant that smoothes the output signal from the operational amplifier 44. Under steady state conditions, with an operator sitting in the control position at the helm of the watercraft, a voltage potential of approximately 0.8 volts is provided at circuit point 46. However, if the voltage signal on line 40 from the sensor 20 suddenly decreases, as when an operator leaves the control position, the inherent response of the operational amplifier 44 is to make the potentials at its inverting and non-inverting inputs equal. As a result, the output signal from the operational amplifier 44 will suddenly decrease and, as a result, the voltage potential at circuit point 46 will be significantly decreased. This low voltage potential will also occur at the inverting input of comparator 50.

With continued reference to FIG. 9, the components R5 and R6 provide a voltage level on line 64 of approximately 3.2 volts to the non-inverting input 52 of comparator 50. As a result, comparator 50 compares the potential at circuit point 46 with the potential of 3.2 volts at the non-inverting input 52 of comparator 50. When the sensor 20 is at the steady state condition, with the human operator located within the control position, the voltage potential at circuit point 46 and at the inverting input of comparator 50 is approximately 3.9 volts. Therefore, the potential at the inverting input of comparator 50 is approximately 0.7 volts above the potential at the non-inverting input 52. As a result, the signal at circuit point 70 is generally equal to zero as long as the operator of the marine vessel is located within the control position.

The voltage potential at circuit point 72 is 3.1 volts. The output of comparator 50, at circuit point 70, is generally equal to zero as long as an operator is in the appropriate location within the control position. As a result, comparator 80 provides a generally zero volt output on line 84 when an operator is in the control position because its non-inverting input 86 is generally equal to zero and its inverting input at circuit point 72 is equal to 3.2 volts. This provides a low signal to the ECU 90 which is connected to circuit point 92 of the monitor circuit of FIG. 9. An over-ride switch ES is provided to enable the operator to over-ride the operation of the circuit in FIG. 9 under certain emergency situations. By opening switch ES, the circuit is disarmed so that no high signal can be sent on line 84 to point 92 and the engine control unit 90.

When the operator of the marine vessel leaves the control position, the output of operational amplifier 44 goes below 3.2 volts at circuit point 46 and an output of approximately 6.8 volts is provided at circuit point 70 by comparator 50. This output at the non-inverting input 86 of comparator 80 is greater than the 3.1 volts level at circuit point 72 and a high signal of approximately 6.8 volts is provided on line 84. As a result, a high signal is provided at circuit point 92 whenever the operator leaves the control position for any reason when in gear.

With continued reference to FIG. 9, resistors Q1 and Q2, in combination with resistors R9–R12, provide an important function for the monitor circuit of FIG. 9. When both the start switch SS and neutral switch NS are opened, the voltage at circuit point 110 is equal to 4.32 volts. This represents a condition when the operator is not trying to start the engine with the start switch SS and, most importantly, with the transmission in either forward or reverse gear, as represented by the opened neutral switch NS. Under these conditions, it is important that the monitor circuit of FIG. 9 monitor the condition at the control position to make sure that the operator of the marine vessel is within the control position. When the gear selector is in a neutral position and the neutral switch NS is closed, circuit point 110 is connected to ground through the starting solenoid 34. This drops the potential at circuit point 110 to zero and causes conduction through the PNP transistor Q1. The voltage at circuit point 46 becomes 8 volts as a result of the conduction of current from circuit point 46 through transistor Q1 and through the closed neutral switch NS. As a result of the neutral switch NS being closed, the 8 volt potential at circuit point 46 prevents comparator 50 from providing a high output at circuit point 70, regardless of the voltage provided by the sensor 20 on line 40.

If the operator begins to start the engine, by closing the start switch SS, circuit point 110 is connected directly to the output of the 12 volt battery 30. This provides a voltage at the base of NPN transistor Q2 that turns transistor Q2 on. As a result, circuit point 70 is connected to ground through transistor Q2 and the voltage at the non-inverting input 86 of comparator 80 remains lower than the four volt potential at the inverting input of comparator 80, which is the circuit point 72. Therefore, regardless of the output from sensor 20 on line 40, comparator 80 will not provide a high signal on line 84 to circuit point 92 and the engine control unit 90.

With continued reference to FIG. 9, a sudden decrease in the output signal from the sensor 20, on line 40, will result in circuit point 46 decreasing suddenly. This provides an output signal from comparator 50 as circuit point 70 which is greater than the voltage potential at circuit point 72. As a result, comparator 80 provides a high signal on line 84 to circuit point 92 and to the engine control unit 90. This high signal at circuit point 92 represents a condition in which the engine should be deactivated immediately. This deactivation is in response to the operator leaving the control position at the helm.

If either the neutral switch NS or the start switch SS is closed, the normal operation of the circuit in FIG. 9 is inhibited and no output signal will be provided at circuit point 92, regardless of the magnitude of the signal on line 40 from sensor 20.

The present invention provides a monitor circuit that appropriately reacts to a change of heat source within the control position from a relatively "hot" condition to a relatively "cold" condition, as would occur if a human being leaves the location of the control position. In this way, an infrared sensor 20 can be used as a tetherless occupant detector in conjunction with the helm of a marine vessel.

Known systems use a tether for these purposes, as described in U.S. Pat. No. 4,839,478. The present invention performs the function of the physical tether in these types of tether deadman switches, but does not require any direct contact with the operator of the marine vessel.

Although the marine vessel is represented in FIGS. 1–8 in a highly schematic manner, to simplify the illustrations, more detailed representations of a marine vessel are shown in U.S. Pat. Nos. 4,092,754 and 5,108,321. In addition, the marine propulsion system 130 represented by a dashed box in FIG. 9 and connected in signal communication, by dashed line 134, to the engine control unit 90 is illustrated in more detail in U.S. Pat. No. 5,108,321. The precise type of marine propulsion system used in conjunction with the present invention is not limiting to its scope. The present invention can be used in conjunction with outboard motors or outboard engines, as shown in U.S. Pat. No. 5,108,321 or in conjunction with either stem drive systems or inboard systems. In addition, while the present invention is particularly configured to operate in conjunction with an infrared sensor, it should be understood that other types of detection sensors can be used in conjunction with the present invention. In a typical application, the control position is essentially defined by the location of a seat, such as the one described in U.S. Pat. No. 5,171,063, but it should be understood that in certain marine vessels the operator of the watercraft can stand at the steering wheel 18 during operation of the boat.

As described above, the sensor provides an output signal on line 40 which is representative of a certain condition, such as the heat generated by the presence of a human being in the control position. In a broad sense, the sensor 20 and the operational amplifier 44 combine to provide a sensor which provides an output signal at circuit point 46 which is representative of a first preselected characteristic of the control position. In other words, the first preselected characteristic is the sudden decrease in heat within the control position that occurs when the operator of the boat suddenly leaves the control position. The monitor circuit, as shown in FIG. 9, is connected with the sensor 20 for deactivating the marine propulsion system 130 in response to a second preselected characteristic of the output signal. This second characteristic of the output signal on line 40 is its sudden decrease in signal magnitude which results because the operator has left the control position.

TABLE I

| REFERENCE NUMERAL | TYPE |
|---|---|
| C1 | 10 μf |
| C3 | 47 μf |
| C4 | 10 μf |
| C5 | 1 μf |
| C6 | 0.01 μf |
| C7 | 0.01 μf |
| R1 | 330 Ω |
| R2 | 100 kΩ |
| R4 | 16 kΩ |
| R5 | 100 kΩ |
| R6 | 68 kΩ |
| R7 | 100 kΩ |
| R8 | 1 MΩ |
| R9 | 1 kΩ |
| R10 | 9.2 kΩ |
| R11 | 11 kΩ |
| R12 | 1 kΩ |
| R13 | 1 MΩ |
| R14 | 10 kΩ |
| R15 | 1 kΩ |

Table I shows the components described in FIG. 9.

Although the present invention has been described in particular detail to illustrate a preferred embodiment, it should be understood that alternative embodiments are also within its scope.

We claim:

1. An occupant sensing system for a watercraft, comprising:
   a marine propulsion system attached to said watercraft;
   a control position where a vessel control mechanism is located for manipulation by an operator of said watercraft to control the operation of said marine propulsion system;
   a sensor directed toward said control position and having an output signal which is representative of a first preselected characteristic of said control position; and
   a monitor circuit connected in signal communication with said sensor for deactivating said marine propulsion system in response to a second preselected characteristic of said output signal, said monitor circuit being connected in signal communication with a neutral switch, whereby said monitor circuit only deactivates said marine propulsion system when said neutral switch is in a position signifying that said marine propulsion system is in either forward or reverse gear.

2. The system of claim 1, wherein:
   said first characteristic is a heat magnitude at a preselected location within said control position.

3. The system of claim 2, wherein:
   said sensor is an infrared sensor.

4. The system of claim 1, wherein:
   said second preselected characteristic is a decrease in the magnitude of said output signal.

5. The system of claim 1, wherein:
   said monitor circuit is connected in signal communication with a start switch of said marine propulsion system.

6. The system of claim wherein:
   said monitor circuit comprises a portion that provides a time delay of a preselected duration subsequent to said marine propulsion system being started, as represented by a preselected status of said start switch, during which said monitor circuit does not deactivate said marine propulsion system in response to said second preselected characteristic of said output signal.

7. The system of claim 1, wherein:

said monitor circuit has a deactivation signal output which is representative of an occurrence of said second preselected characteristic of said output signal.

8. The system of claim 7, further comprising:

an engine control unit connected in signal communication with said monitor circuit and with a component of said marine propulsion system, whereby said electrical signal deactivates said marine propulsion system by providing said deactivation signal to said engine control unit which deactivates said marine propulsion system in response to receipt of said deactivation signal from said monitor circuit.

9. The system of claim 1, wherein:

said control position is a seat where said operator of said watercraft is located at during operation of said watercraft.

10. The system of claim 1, wherein:

said sensor in mounted on a dashboard of said watercraft.

11. The system of claim 1, wherein:

said sensor is mounted on a throttle control housing of said watercraft.

12. The system of claim 1, wherein:

said sensor is mounted on a steering wheel of said watercraft.

13. The system of claim 1, wherein:

said sensor is mounted under a dash board of said watercraft.

14. An occupant sensing system for a watercraft, comprising:

a marine propulsion system attached to said watercraft;

a control position where a vessel control mechanism is located for manipulation by an operator of said watercraft to control the operation of said marine propulsion system, said vessel control mechanism being selected from the group consisting of a steering wheel, a throttle lever, and an ignition switch;

a sensor directed toward said control position and having an output signal which is representative of a first preselected characteristic of said control position, said first characteristic being a heat magnitude at a preselected location within said control position; and a monitor circuit connected in signal communication with said sensor for deactivating said marine propulsion system in response to a second preselected characteristic of said output signal, said monitor circuit being connected in signal communication with a neutral switch, whereby said monitor circuit only deactivates said marine propulsion system when said neutral switch is in a position signifying that said marine propulsion system is in either forward or reverse gear.

15. The system of claim 14, wherein:

said sensor is an infrared sensor, said second preselected characteristic being a decrease in the magnitude of said output signal.

16. The system of claim 15, wherein:

said monitor circuit is connected in signal communication with a start switch of said marine propulsion system, said monitor circuit comprising a portion that provides a time delay of a preselected duration subsequent to said marine propulsion system being started, as represented by a preselected status of said start switch, during which said monitor circuit does not deactivate said marine propulsion system in response to said second preselected characteristic of said output signal, said monitor circuit having a deactivation signal output which is representative of an occurrence of said second preselected characteristic of said output signal.

17. The system of claim 16, further comprising:

an engine control unit connected in signal communication with said monitor circuit and with a component of said marine propulsion system, whereby said electrical signal deactivates said marine propulsion system by providing said deactivation signal to said engine control unit which deactivates said marine propulsion system in response to receipt of said deactivation signal from said monitor circuit.

18. An occupant sensing system for a watercraft, comprising:

a marine propulsion system attached to said watercraft;

a control position where a vessel control mechanism is located for manipulation by an operator of said watercraft to control the operation of said marine propulsion system, said vessel control mechanism being selected from the group consisting of a steering wheel, a throttle lever, and an ignition switch;

an infrared sensor directed toward said control position and having an output signal which is representative of a first preselected characteristic of said control position;

a monitor circuit connected in signal communication with said infrared sensor for deactivating said marine propulsion system in response to a second preselected characteristic of said output signal, said monitor circuit being connected in signal communication with a neutral switch, whereby said monitor circuit only deactivates said marine propulsion system when said neutral switch is in a position signifying that said marine propulsion system is in either forward or reverse gear, said monitor circuit being connected in signal communication with a start switch of said marine propulsion system, said monitor circuit comprising a portion that provides a time delay of a preselected duration subsequent to said marine propulsion system being started, as represented by a preselected status of said start switch, during which said monitor circuit does not deactivate said marine propulsion system in response to said second preselected characteristic of said output signal, said monitor circuit having a deactivation signal output which is representative of an occurrence of said second preselected characteristic of said output signal; and an engine control unit connected in signal communication with said monitor circuit and with a component of said marine propulsion system, whereby said electrical signal deactivates said marine propulsion system by providing said deactivation signal to said engine control unit which deactivates said marine propulsion system in response to receipt of said deactivation signal from said monitor circuit.

19. The system of claim 18, wherein:

said control position is a seat where said operator of said watercraft is located at during operation of said watercraft.

* * * * *